H. G. VOIGHT.
TIRE CARRIER.
APPLICATION FILED APR. 26, 1920.
1,362,654.  Patented Dec. 21, 1920.
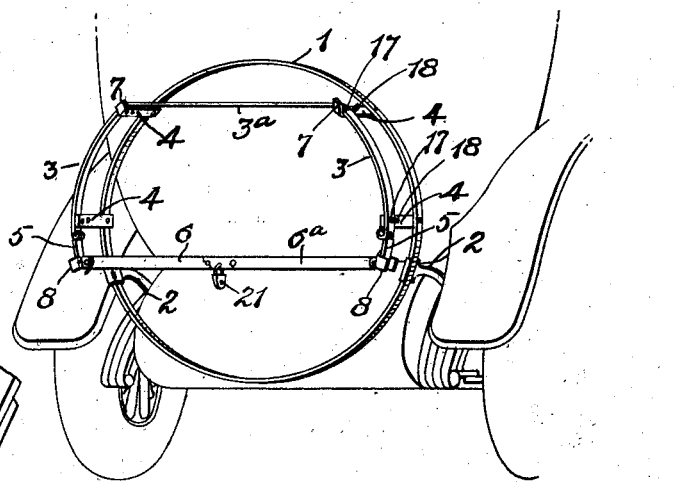
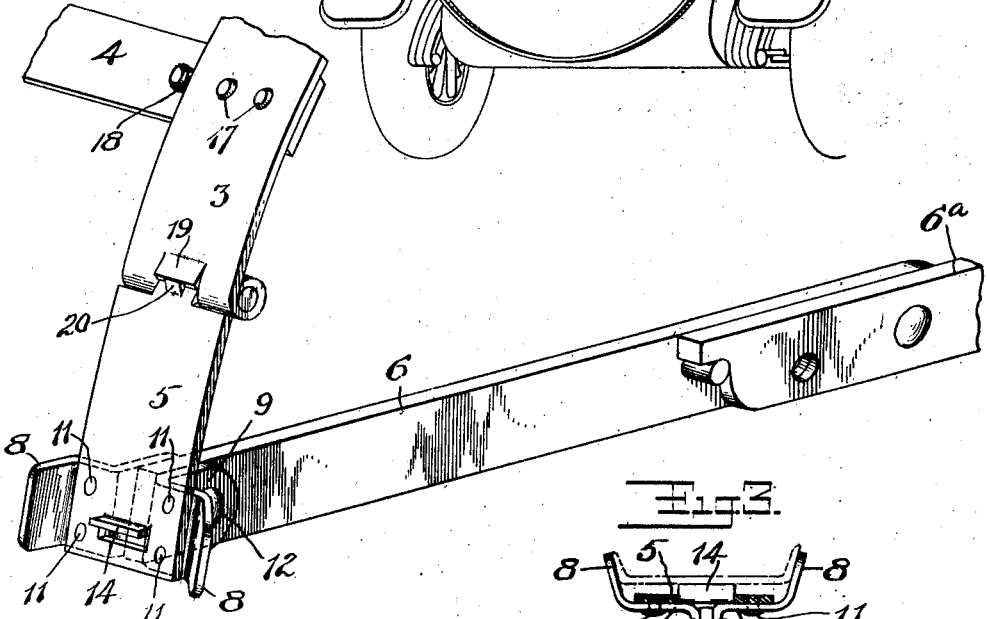
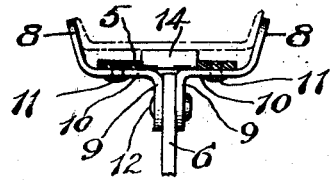
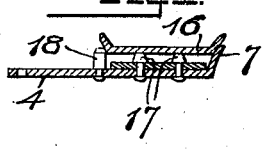
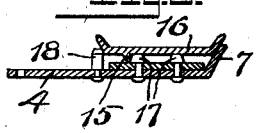
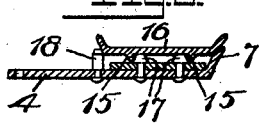

UNITED STATES PATENT OFFICE.

HENRY G. VOIGHT, OF NEW HAVEN, CONNECTICUT.

TIRE-CARRIER.

1,362,654.   Specification of Letters Patent.   Patented Dec. 21, 1920.

Application filed April 26, 1920. Serial No. 376,584.

*To all whom it may concern:*

Be it known that I, HENRY G. VOIGHT, a citizen of the United States of America, residing at New Haven, New Haven county, Connecticut, have invented a new and useful Tire-Carrier, of which the following is a specification.

My invention relates to improvements in tire carriers, and is primarily an improvement on the construction set forth in my co-pending application, Serial No. 364,442, filed March 9, 1920. The present construction I term a duplex holder, in that it is adapted to carry two rims on which tires may be mounted. The arrangement is such that one size and style of carrier is suitably designed to successfully carry the various styles of rims of one size. I have also improved certain structural features which are of benefit and advantage as will hereinafter be seen.

In the drawings:

Figure 1 is a conventional showing of the rear portion of a vehicle with my improved duplex holder applied thereto and shown in perspective.

Fig. 2 is a relatively enlarged detail view in perspective.

Fig. 3 is an end view partly in section of certain parts.

Figs. 4, 5, and 6 are sections illustrating different styles of tire rims and their method of application on my carrier.

1 is a circular tire rim carrier of any appropriate construction which I will term the main carrier. This main carrier is preferably endless as shown, and is connected to the vehicle in any suitable way as by brackets 2—2. It may also have any suitable clips or other fastening devices to hold a rim thereon. That part of the apparatus which is designed to carry the second rim, and which I will term the secondary carrier comprises two side pieces 3—3 of general circular contour and of smaller diameter than the rim to be mounted thereon. The secondary carrier is rigidly connected to the ring 1 by brackets 4—4. If desired, the upper ends of the side pieces 3—3 may be connected by a crossbar 3ª. At the lower end of each side 3—3, I provide hinged rim gripping sections 5—5, as in my former application, the same functioning in the same manner and being operated by means of two pivotally connected toggle levers 6—6ª, the outer ends of the toggle levers being pivotally connected to the ends of the gripping sections 5—5. In the particular construction shown, the rigid part of the secondary carrier is provided at intervals with suitable rim holding flanges at 7—7 arranged to hold a tire rim by engaging the outer edge of the same. A rim clamping jaw is likewise provided at the free end of each gripping section 5—5, and these clamping jaws are preferably constructed so as to perform the double function of gripping the tire and of constituting a hinge bearing for the toggles. In Figs. 2 and 3, I have shown the gripping jaw at the lower end of the section 5 as formed of two angular pieces, each piece being so bent as to provide one jaw member 8, one hinge bearing portion 9, and an intermediate connecting portion 10, which intermediate portion may be secured to the section 5 in any suitable manner as by rivets 11—11. When two of these angular pieces are secured to the opposite sides of the section 10 there will be a space provided between the toggle bearing ends 9—9 of a width sufficient to receive the end of the toggle bar 6. 12 is a hinge pin which passes through the bearing ends 9—9 and the toggle bar 6. 14 is a spacer device in the form of a lug struck up from the metal of the piece 5, and extending radially out of the piece. The length of this struck up spacer is less than the distance between the annular beads 15—15 customarily used on certain types of tire rims, for example, such as indicated on the rim 16 in Fig. 6. The rigid portion of the carrier may have equivalent spacing means such as spacer studs 17 which are designed to perform the same function, that is to say, these studs serve to space the flat interior surface of the tire rim away from the outer surface of the carrier a distance equal to the height of the ribs or beads 15, and these same spacers when used with a rim having no beads, such as indicated at 16ª, Fig. 4, likewise serve to hold the rim properly on the carrier. 18 are holder studs or shoulders somewhat higher than the spacer studs 17—17 and provided to engage the inner edge of a tire rim when the same is slipped onto the carrier. The high studs 18—18 coöperate with the flanges 7—7 to form the complete holding jaws. To prevent the lower hinged sections 5—5 of the carrier from swaying when no tire rim is in place on the carrier, I provide suitable stops. In the present instance, I provide these stops at the hinge knuckle where the part 5 is connected to the part 3. In the preferred form, I strike out from one knuckle a lug 19 at the back of the hinge, and I may also strike out from the other knuckle another lug 20 at the back of said hinge, so that when the toggle levers are straightened out these lugs 19—20 will engage each other at opposite sides of the carrier and thus both hinge sections 5 will be prevented from swaying. The spacer studs 17 should be provided adjacent to and between the holder jaws so that they will function to support a tire rim 16 having a plain flat inner surface such as shown in Fig. 4; or having one internal rib 15 such as shown in Fig. 5; or one having two ribs 15—15, such as shown in Fig. 6, thus making it possible to mount any style of tire rim adapted to receive one size of tire upon the carrier.

The main carrier rim 1 need not in all instances have clamping devices since it is intended to carry only one spare tire that may be carried upon that portion of the carrier equipped with the rim gripping sections 5—5, whereas if two tires are to be carried, the one adjacent to the rim 1 may be held in place by the mere presence of the second rim on the secondary carrier.

By my invention tire rims may be very quickly applied or removed and will be securely held in place when on the carrier.

21 is a padlock, the hasp of which may pass through registering holes on the overlapping ends of the toggles to positively lock the same, this constituting only one preferred form of locking device that may be employed for this purpose.

In the present case as in my former case, the distance from the hinge of the jaw gripping sections up and over the secondary carrier is preferably less than 180°, while the distance from the jaws 8—8 measured in the same way is somewhat over 180°; so that when the tire rim is in place, the moving out of the rim gripping sections into the rim holding jaws will hold the rim down on the upper part of the carrier so that it cannot be lifted and freed from the jaw ends 7—7.

What I claim is:

1. In a duplex tire carrier, a main tire carrying ring arranged to carry one tire rim, a secondary tire carrying device rigidly connected to the first but spaced apart therefrom, said secondary carrier comprising two side pieces having a plurality of spaced rim engaging jaws arranged to engage the edge of a tire rim at proper intervals to prevent movement of the same thereon, with spacer means on said secondary carrier arranged to engage and hold the flat inner surface of the tire rim in spaced relation to the outer surface of said secondary carrier to afford clearance for beads or other projections on the inner surface of the tire rim, whereby said carrier is adapted to carry tire rims of different styles, two of said jaws being mounted to move toward and away from the center of the carrier to release or engage a tire rim.

2. In a duplex tire carrier, a main tire carrying ring arranged to carry one tire rim, a secondary carrying device rigidly connected to said ring but spaced apart therefrom, said secondary carrier comprising two rigid side pieces having a plurality of spaced jaws arranged to engage the edges of a tire rim at proper intervals to prevent movement of the same thereon, spacer means on said secondary carrier arranged to engage and hold the flat inner surface of the tire rim in spaced relation to the outer surface of said secondary carrier to afford clearance for beads or other projections on the inner surface of the tire rim, whereby said carrier is adapted to carry tire rims of different styles, two of said jaws being mounted to move toward and away from the center of the carrier to release or engage a tire rim, and hinged end pieces carrying said movable jaws.

3. In a duplex tire carrier, a main tire carrying ring arranged to carry one tire rim, a secondary carrying device rigidly connected to said ring but spaced apart therefrom, said secondary carrier comprising two rigid side pieces having a plurality of spaced jaws arranged to engage the opposite edges of a tire rim at proper intervals to prevent movement of the same thereon, spacer means on said secondary carrier arranged to engage and hold the flat inner surface of the tire rim in spaced relation to the outer surface of said secondary carrier to afford clearance for beads or other projections on the inner surface of the tire rim, whereby said carrier is adapted to carry tire rims of different styles, two of said jaws being mounted to move toward and away from the center of the carrier to release or engage a tire rim, and hinged end pieces carrying said movable jaws, and stop means to prevent said hinged pieces from swaying when no rim is in place thereon.

4. In a duplex tire carrier, a main tire carrying member arranged to carry one tire rim, a secondary rim carrying member rigidly connected to said main member and spaced apart therefrom, said secondary carrying member comprising a rigid portion, spacing means carried thereby for holding a tire rim in spaced relation to the outer surface of said secondary carrier to afford clearance for beads or other projections on the inner surface of the tire rim, whereby said carrier is adapted to carry tire rims of different styles, a pair of rim gripping sections hinged at the opposite lower ends of the secondary carrier with toggle levers connecting said hinged sections, jaws carried by the secondary carrier and spaced apart at proper intervals to prevent movement of the same when said hinged sections are moved into the tire holding position.

5. In a tire rim carrier a rigid support, two depending rim-gripping sections hinged at the lower opposite ends of said support, a pair of toggle levers connected to said hinged sections to move the same in and out, and stop mechanism to prevent swaying of said hinged sections when no tire rim is in place, part of said rim-gripping sections comprising part of said stop mechanism.

HENRY G. VOIGHT.